UNITED STATES PATENT OFFICE.

RICHARD PEARCE, OF DENVER, COLORADO.

PROCESS OF SMELTING ORES OF GOLD AND SILVER.

SPECIFICATION forming part of Letters Patent No. 249,981, dated November 22, 1881.

Application filed July 15, 1881. (No specimens.)

*To all whom it may concern:*

Be it known that I, RICHARD PEARCE, of Denver, in the county of Arapahoe and State of Colorado, have invented a new and useful Improvement in Processes of Smelting Ores of Gold and Silver, of which the following is a full, clear, and exact specification.

In the treatment of gold and silver ores containing copper the object is to obtain a matte or regulus which shall contain all the valuable metals. It is, however, found that with the usual methods the slag contains a certain amount of gold and silver, which is lost. To obviate this loss by insuring a more complete separation of the precious metals is the object of my invention; and to this end the invention consists in a method of precipitating the particles of gold and silver held in suspension after the smelting is completed in the usual manner.

The operation is as follows: An ordinary reverberatory furnace is used, and being charged with mixed ores the ore is smelted in the usual manner. After four or five hours the ore will be found to be melted and a layer of matte or metal formed covered by a layer of slag. The usual method would be to then draw the slag, and necessarily the particles of precious metal held in suspension would pass off with the slag. In place of that, my method consists in throwing upon the slag as soon as the charge is perfectly smelted fine-powdered oxide of copper, then closing the furnace a short time before drawing the slag. The effect of this application is that a reaction takes place between the oxide of copper and particles of gold and silver, in whatever combination they may exist, and a rich heavy matte is formed, which descends and carries with it the precious metals. For a charge of about three tons of ore about thirty pounds of the oxide will serve the purpose, and in using it care should be taken to scatter the oxide over the whole surface of the slag. In place of oxide of copper, any rich oxidized copper products may be used.

Having thus described my invention, I claim as new and desire to secure by Letters Patent—

As an improvement in smelting gold and silver ores, the process of saving the precious metals usually carried off by the slag, which consists in subjecting the molten slag to the action of oxide of copper or rich oxidized copper products, substantially as described.

RICHARD PEARCE.

Witnesses:
 EDWD. O. WOLCOTT,
 CHARLES W. BETTS.